United States Patent
Kang (10) Patent No.: US 11,202,967 B2
(45) Date of Patent: Dec. 21, 2021

(54) TOY AND USER-CUSTOMIZED TOY SYSTEM

(71) Applicant: Jun Taek Kang, Seoul (KR)

(72) Inventor: Jun Taek Kang, Seoul (KR)

(*) Notice: Subject to any disclaimer, the term of this patent is extended or adjusted under 35 U.S.C. 154(b) by 0 days.

(21) Appl. No.: 16/963,439

(22) PCT Filed: Feb. 19, 2019

(86) PCT No.: PCT/KR2019/001971
§ 371 (c)(1),
(2) Date: Jul. 20, 2020

(87) PCT Pub. No.: WO2019/164216
PCT Pub. Date: Aug. 29, 2019

(65) Prior Publication Data
US 2020/0338463 A1    Oct. 29, 2020

(30) Foreign Application Priority Data

Feb. 26, 2018  (KR) .................. 10-2018-0022822

(51) Int. Cl.
A63H 5/00       (2006.01)
A63H 29/22      (2006.01)
G06F 3/16       (2006.01)
A63H 33/00      (2006.01)

(52) U.S. Cl.
CPC ............ *A63H 5/00* (2013.01); *A63H 29/22* (2013.01); *A63H 33/006* (2013.01); *G06F 3/165* (2013.01); *A63H 2200/00* (2013.01)

(58) Field of Classification Search
CPC ..... A63H 5/00; A63H 33/006; A63H 2200/00
See application file for complete search history.

(56) References Cited

U.S. PATENT DOCUMENTS

| | | | |
|---|---|---|---|
| 8,491,389 B2* | 7/2013 | Weston .............. | A63F 13/211 463/37 |
| 10,369,463 B2* | 8/2019 | Barney ............... | A63F 13/327 |
| 2011/0045736 A1* | 2/2011 | Wooten ............... | A63H 5/00 446/397 |
| 2014/0038489 A1* | 2/2014 | Sharma ............... | A63H 3/28 446/175 |
| 2015/0105608 A1 | 4/2015 | Lipoma et al. | |
| 2016/0059142 A1* | 3/2016 | Krolewski ............ | A63H 3/28 446/298 |

(Continued)

FOREIGN PATENT DOCUMENTS

CN    105137952 A    12/2015
CN    106535044 A    3/2017

(Continued)

*Primary Examiner* — John A Ricci
(74) *Attorney, Agent, or Firm* — Novick, Kim & Lee, PLLC; Jae Youn Kim (57) ABSTRACT

The present invention provides a toy for outputting a sound source, comprising: a sound source output unit; a sensor unit for measuring position and motion information of the toy; a communication unit for transmitting, to an electronic device, the position and motion information measured by the sensor unit and receiving, from the electronic device, a sound source and a control command; and a control unit for controlling the sound source output unit to adjust and reproduce the received sound source according to the control command.

5 Claims, 4 Drawing Sheets

(56) References Cited

U.S. PATENT DOCUMENTS

2017/0189804 A1* 7/2017 Akavia .................... A63H 5/00

FOREIGN PATENT DOCUMENTS

| | | |
|---|---|---|
| CN | 107424627 A | 12/2017 |
| JP | 2002-177656 A | 6/2002 |
| JP | 2004-236758 A | 8/2004 |
| JP | 2008-023127 A | 2/2008 |
| JP | 2011-115936 A | 6/2011 |
| JP | 2013-123524 A | 6/2013 |
| JP | 2016-004261 A | 1/2016 |
| JP | 2017-504996 A | 2/2017 |
| KR | 20-0207540 Y1 | 12/2000 |
| KR | 10-2009-0088567 A | 8/2009 |
| KR | 10-1637111 B1 | 7/2016 |
| KR | 10-1748410 B1 | 6/2017 |

* cited by examiner

| | | \| Movement(mm) | | | | | | | Change in sound volume and sound speed → | | | | |
|---|---|---|---|---|---|---|---|---|---|---|---|---|---|
| | | 50 | 100 | 150 | 200 | 250 | 300 | 350 | 400 | 450 | 500 | 550 | 600 |
| Speed (cm/sec) | 1 | 1 | 1 | 1 | 1 | 1 | 1 | 1 | 1 | 1 | 1 | 1 | 1 |
| | 2 | 1 | 1.05 | 1.07 | 1.09 | 1.10 | 1.15 | 1.20 | 1.25 | 1.30 | 1.35 | 1.45 | 1.50 |
| | 3 | 1 | 1.10 | 1.15 | 1.20 | 1.30 | 1.40 | 1.50 | 1.60 | 1.70 | 1.80 | 1.90 | 2.00 |
| | 4 | 1 | 1.15 | 1.25 | 1.35 | 1.45 | 1.55 | 1.80 | 1.90 | 2.00 | 2.10 | 2.20 | 2.30 |
| | 5 | 1 | 1.20 | 1.40 | 1.50 | 1.70 | 1.90 | 2.00 | 2.15 | 2.30 | 2.45 | 2.50 | 2.60 |
| | 6 | 1 | 1.25 | 1.45 | 1.65 | 1.85 | 2.05 | 2.20 | 2.35 | 2.50 | 2.65 | 2.80 | 3.00 |
| | 7 | 1 | 1.30 | 1.50 | 1.70 | 1.90 | 2.10 | 2.30 | 2.50 | 2.70 | 2.90 | 3.10 | 3.30 |
| | 8 | 1 | 1.35 | 1.60 | 1.85 | 2.20 | 2.40 | 2.50 | 2.70 | 2.90 | 3.15 | 3.40 | 3.60 |
| | 9 | 1 | 1.40 | 1.70 | 2.00 | 2.30 | 2.50 | 2.70 | 2.95 | 3.20 | 3.45 | 3.70 | 4.00 |
| | 10 | 1 | 1.45 | 1.75 | 2.05 | 2.35 | 2.65 | 2.90 | 3.20 | 3.50 | 3.80 | 4.10 | 4.30 |
| | 11 | 1 | 1.50 | 1.85 | 2.20 | 2.55 | 2.90 | 3.10 | 3.40 | 3.70 | 4.00 | 4.30 | 4.60 |
| | 12 | 1 | 1.55 | 2.00 | 2.30 | 2.60 | 3.00 | 3.30 | 3.60 | 4.00 | 4.30 | 4.60 | 5.00 |

FIG. 4

| | Movement(mm) | | | | | | | | | | | Change in sound volume and sound speed → |
|---|---|---|---|---|---|---|---|---|---|---|---|---|
| | | 50 | 100 | 150 | 200 | 250 | 300 | 350 | 400 | 450 | 500 | 550 | 600 |
| Time (sec) | 0.1 | / | 1.55 | 2.00 | 2.30 | 2.60 | 3.00 | 3.30 | 3.60 | 4.00 | 4.30 | 4.60 | 5.00 |
| | 0.2 | / | 1.50 | 1.85 | 2.20 | 2.55 | 2.90 | 3.10 | 3.40 | 3.70 | 4.00 | 4.30 | 4.60 |
| | 0.3 | / | 1.45 | 1.75 | 2.05 | 2.35 | 2.65 | 2.90 | 3.20 | 3.50 | 3.80 | 4.10 | 4.30 |
| | 0.4 | / | 1.40 | 1.70 | 2.00 | 2.30 | 2.50 | 2.70 | 2.95 | 3.20 | 3.45 | 3.70 | 4.00 |
| | 0.5 | / | 1.35 | 1.60 | 1.85 | 2.20 | 2.40 | 2.50 | 2.70 | 2.90 | 3.15 | 3.40 | 3.60 |
| | 0.6 | / | 1.30 | 1.50 | 1.70 | 1.90 | 2.10 | 2.30 | 2.50 | 2.70 | 2.90 | 3.10 | 3.30 |
| | 0.7 | / | 1.25 | 1.45 | 1.65 | 1.85 | 2.05 | 2.20 | 2.35 | 2.50 | 2.65 | 2.80 | 3.00 |
| | 0.8 | / | 1.20 | 1.40 | 1.70 | 2.20 | 1.90 | 2.00 | 2.15 | 2.30 | 2.45 | 2.50 | 2.60 |
| | 0.9 | / | 1.15 | 1.25 | 1.45 | 2.30 | 1.55 | 1.80 | 1.90 | 2.00 | 2.10 | 2.20 | 2.30 |
| | 1.0 | / | 1.10 | 1.25 | 1.30 | 2.35 | 1.40 | 1.50 | 1.60 | 1.70 | 1.80 | 1.90 | 2.00 |
| | 1.1 | / | 1.05 | 1.15 | 1.10 | 2.55 | 1.15 | 1.20 | 1.25 | 1.30 | 1.35 | 1.45 | 1.50 |
| | 1.2 | / | / | / | / | / | / | / | / | / | / | / | / |

FIG. 5

TOY AND USER-CUSTOMIZED TOY SYSTEM

TECHNICAL FIELD

The present invention relates to a toy and a user-customized toy system.

BACKGROUND ART

Recently, technologies for user-customized products are under active development in various fields, and accordingly various types of user-customized products have been introduced.

Even in the field of toys, apart from the conventional products using physical devices and products operated using electronic devices, various types of user-customized products are being developed.

In particular, as for toy products outputting a sound source, various approaches have been attempted in terms of how to check the state of the user and reproduce the sound source in consideration thereof.

DETAILED DESCRIPTION OF INVENTION

Technical Task

It is an object of the present invention to provide a toy and a user-customized toy system, specifically, a toy and a toy system which output a sound source and consider the state and environment of the user.

The technical tasks of the present invention are not limited to the foregoing, and a person skilled in the art can clearly understand other technical tasks not mentioned above from the following description.

Means for Solving Technical Task

In order to solve the technical task, the present invention provides a toy for outputting a sound source, comprising: a sound source output unit; a sensor unit for measuring position and motion information of the toy; a communication unit for transmitting, to an electronic device, the position and motion information measured by the sensor unit and receiving, from the electronic device, a sound source and a control command; and a control unit for controlling the sound source output unit to adjust and reproduce the received sound source according to the control command.

The present invention provides a toy wherein the position and motion information includes at least one of position information, position movement information, position movement time information, movement speed information and movement acceleration information.

The present invention provides a toy wherein the control command includes a sound volume value and a sound speed value of a sound source with respect to the measured position and motion information provided using a relation table between the predetermined position and motion information and the sound volume and the sound source of the sound source.

The present invention provides a toy wherein when the measured position and motion information maintains a predetermined value for a certain period of time, the control unit controls the communication unit and receives, from the electronic device, a sound source other than the above sound source.

The present invention provides a toy further comprising: an external voice collection unit for receiving an external voice; and a biometric information measurement unit for measuring biometric information of the user, wherein when the measured position and motion information maintains a predetermined value for a certain period of time, and the voice data received from the external voice collection unit and the biometric information data received from biometric information measurement unit exceed predetermined values, the electronic device manages the corresponding sound source as an abnormal sound source.

Effect of Invention

According to an embodiment of the present invention, the toy and toy system which output a sound source and consider the state and environment of the user can select, adjust and output a sound source in consideration of the characteristic of individual users or the surrounding environment, and accordingly increase the user's immersion level and the user's utilization thanks to the realistic sound source.

Also, by providing a sound source in consideration of the user's response, it is possible to provide the user with a sense of stability by stimulating the user's emotion and providing a suitable sound source in response to the change of the user's emotion.

The effects of the present invention are not limited to the above-mentioned effects, and a person skilled in the art can clearly understand other effects not mentioned above from the following description.

BEST MODE FOR CARRYING OUT THE INVENTION

Hereinafter, preferred embodiments according to the present invention will be described in detail with reference to the accompanying drawings.

The following detailed description, together with the accompanying drawings, is intended to illustrate exemplary embodiments of the invention and is not intended to represent the only embodiments in which the invention may be carried out.

In order to clearly describe the present invention in the drawings, parts not related to the description may be omitted, and the same reference numerals may be used for the same or similar components throughout the specification.

In an embodiment of the present invention, the expressions "or," "at least one," etc. may denote one of the words listed together or may represent a combination of two or more.

For example, "A or B" and "at least one of A and B" may include only one of A or B, and may include both A and B.

Figure 1:
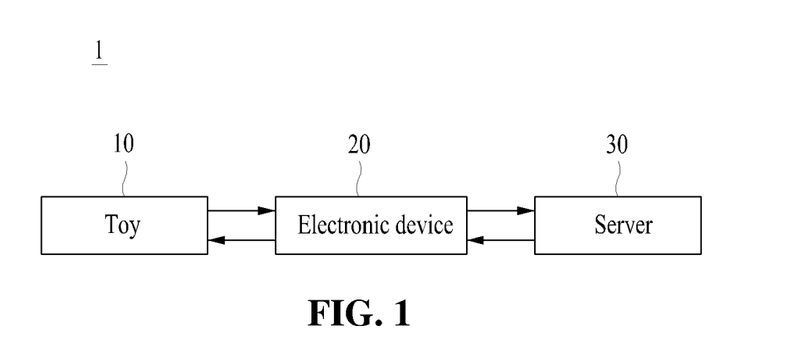
FIG. 1 illustrates a user-customized toy system according to an embodiment of the present invention.

FIG. 1 illustrates a user-customized toy system according to an embodiment of the present invention.

Referring to FIG. 1, the user-customized toy system 1 of the present invention may comprise a toy 10, an electronic device 20, and a server 30.

Hereinafter, in the embodiments, the toy 10 will be explained focusing on the rattle 10, but the present invention is not limited thereto, and it is obvious that the same technical idea may be applied to various toys.

The rattle 10 comprises a sensor unit for measuring position and motion information, so as to measure the position and motion information such as position, position movement, position movement time, position movement speed and position movement acceleration of the rattle 10, and transmit the measured position and motion information to the electronic device 20.

The electronic device 20 may determine a sound source using the position and motion information received from the rattle 10 and transmit the determined sound source to the rattle 10.

Specifically, when position movement of the rattle 10 is identified, the electronic device 20 may recognize the rattle 10 to be in a usage mode and transmit a rattle sound source to the rattle 10, and the rattle 10 may reproduce the received sound source.

Also, when the position movement speed or the position movement acceleration corresponds to a specific section in consideration of the position movement speed and the position movement acceleration of the rattle 10, the electronic device 20 may transmit a control command for adjusting and reproducing the sound volume and the sound speed of the sound source to the rattle 10.

That is, when the movement speed of the rattle 10 is fast or the change in movement speed increases greatly, the sound volume and the sound speed of the sound source may be adjusted in correspondence to the change, thereby increasing the realism of the sound source reproduced in the rattle 10.

The electronic device 20 may predetermine and store a relation table of the sound volume and sound speed of the sound source with respect to the position and motion information, or receive and store the relation table from the server 30, so as to apply the received position and motion information to the relation table, extract the sound volume value and sound speed value of the corresponding sound source, and include the extracted sound volume value and sound speed value of the sound source in the control command and transmit the same.

The rattle 10 may adjust and reproduce the received sound volume and sound speed of the sound source in real time according to the received control command.

On the other hand, when there is no position movement for a certain period of time or the position movement speed and the position movement acceleration are within or below a predetermined range for a certain period of time, through the position and motion information, the electronic device 20 may stop transmitting the rattle sound source and transmit another sound source to the rattle 10.

Specifically, the other sound source may be one of a sound source group that develops hearing such as a wind sound source, a wave sound source, a stream sound source, etc., one of a sound source group that stimulates hearing such as a dog sound source, a cat sound source, a bird sound source, etc., one of a sound source group that provides a sense of security to the user such as a mother voice sound source, a father voice sound source, a family voice sound source, etc., or one of a sound source group that induces sleeping such as a lullaby sound source, a sleepin a sound source, a classical music sound source, etc.

It is possible to determine which sound source is to be selected using big data analysis material in consideration of the user's current state according to the motion pattern predetermined and stored, or received from the server 30.

For example, when the position of the rattle 10 moves within a certain range and the movement speed increases at a specific cycle, it may be determined that the user is in a drowsy state, and a sound source from the sound source group that induces sleeping may be provided.

Also, when the movement acceleration of the rattle 10 greatly increases, it may be determined that the user is in an anger and anxiety state, and a sound source from the sound source group that provides a sense of stability may be provided.

The corresponding pattern may be determined using big data analysis material while being updated in real time or at certain intervals, and the user's reaction to the sound source provided may be reflected in the big data analysis material.

In addition, the rattle 10 may measure the biometric information of the user, collect the user's voice, and transmit the measured and collected data to the electronic device 20.

The user's biometric information may include body temperature information and pulse information, and the electronic device 20 may accurately recognize the current state, situation and environment of the user using body temperature information, pulse information and voice information of the user in addition to the previously received position and motion information, and provide the most suitable sound source to the rattle 10 according to the corresponding state, situation and environment.

For example, when the movement acceleration of the rattle 10 greatly increases but the user's crying is not detected and the pulse slightly increases, it may be recognized that the user is in a pleasant state, not in an anger or anxiety state, and accordingly it is possible to control the sound speed of the rattle sound source to increase while continuing the transmission of the sound source of the rattle.

On the other hand, when the state of the user suddenly changes to a predetermined range or above according to the change in sound source, sound volume and sound speed, it may be recognized that the user is showing a negative reaction to the change of the corresponding sound source, sound volume and sound speed.

Specifically, in case the position of the rattle 10 moved suddenly, or the movement speed of the rattle 10 suddenly changed when the sound source changed, it is determined that the user does not like the corresponding sound source and the corresponding sound source may be changed.

When a negative sound source is reproduced together with the corresponding sound source, the electronic device 20 may transmit the corresponding position and motion information, biometric information of the user and the voice of the user to the server 30 and utilize the same as big data analysis material.

Also, the electronic device 20 may store response information according to the sound source, sound volume, and sound acceleration information provided to the user through the big data analysis material received from the server 30, and provide a user-customized rattle 10 using the corresponding stored information.

For example, it is possible to exclude the reproduction of a tiger sound source and increase the reproduction frequency of an elephant sound source using the response information prestored for each user.

Further, it is possible to specify the user and provide a sound source suitable for the specified user using the position and motion information received from the rattle 10 and the movement pattern information using the same.

For example, even when information on the user is not input to the electronic device 20, the user may be specified using the motion information and pattern information of the rattle 10, and it is possible to distinguish a preferred sound source from a non-preferred sound source grouped with respect to the corresponding user and control the preferred sound source to be reproduced.

Also, it is possible to estimate the age of the user using motion information and pattern information of the rattle 10, and control a sound source to be reproduced in a predetermined age-specific sound source group corresponding to the estimated age.

In addition, the electronic device 20 may check the state of the user through the biometric information of the user collected from the rattle 10 and the voice information of the user, and check relation information between a specific motion pattern and a user state through the relation and comparison between the user state checked and the position and motion information.

Later, when showing a negative response to a specific sound source using the relation information between a specific movement pattern and a user state, the corresponding sound source may be classified as an abnormal sound source.

The relation information between a movement pattern and a user state may be updated every time the information is accumulated or in real time, and may be utilized as relation information of a specific user or relation information of a specific age group.

The corresponding information may be transmitted from the electronic device 20 to the server 30 to be utilized as data for analyzing big data.

Figure 2:
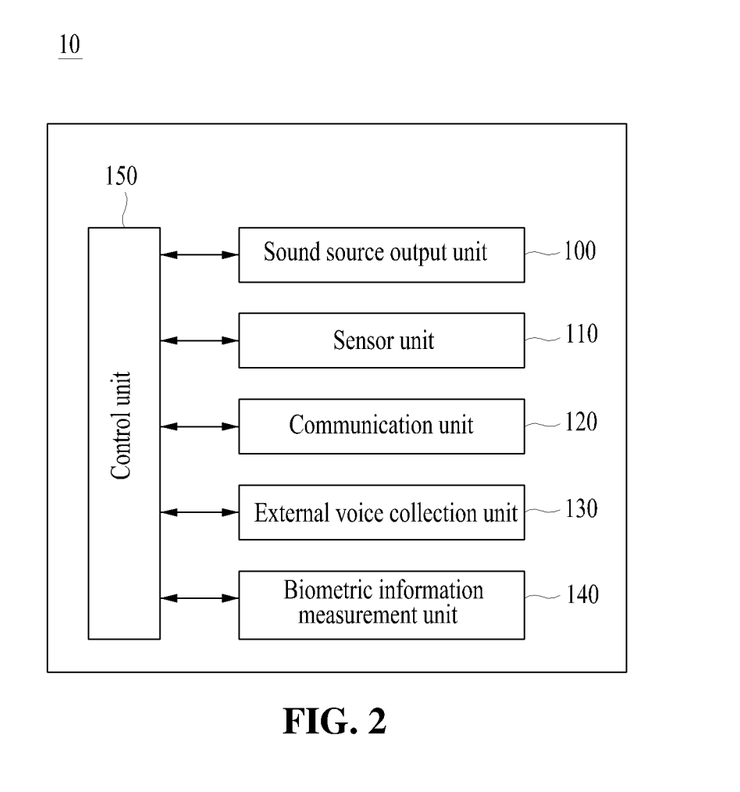
FIG. 2 illustrates a configuration of a toy according to an embodiment of the present invention.

FIG. 2 illustrates a configuration of a toy 10 according to an embodiment of the present invention.

As mentioned above, for the sake of convenience in explanation, a rattle 10 is presented as an example of the toy 10, but the present invention is not limited thereto.

Referring to FIG. 2, the rattle 10 may comprise a sound output unit 100, a sensor unit 110, a communication unit 120, an external sound collection unit 130, a biometric information measurement unit 140 and a control unit 150.

The sound source output unit 100 may reproduce various types of sound sources, and adjust the sound speed or sound volume of the same sound source in real time and output the same.

The sensor unit 110 may measure position and motion information, specifically, position and motion information such as the position, position movement, position movement time, position movement speed and position movement acceleration of the rattle 10.

For example, the sensor unit 110 may include a gyro sensor and an acceleration sensor.

The communication unit 120 may be wiredly or wirelessly connected to the electronic device 20 through a network, so as to transmit the position and motion information measured by the sensor unit 110 to the electronic device 20, or to receive data such as sound source or control command from the electronic device 20.

For example, the communication unit 120 may include at least one of a long-term evolution (LTE) module, an LTE Advance (LTE-A) module, a code division multiple access (CDMA) module, a wideband CDMA (WCDMA) module, a universal mobile telecommunications system (UMTS) module, a Wireless Broadband (WiBro) module, a Global System for Mobile Communications (GSM) module, a wireless fidelity (WiFi) module, a Bluetooth module, a near field communication (NFC) module, a global navigation satellite system (GNSS) module, a universal serial bus (USB) module, a high definition multimedia interface (HDMI) module, a recommended standard232 (RS-232) module and a plain old telephone service (POTS).

The external voice collection unit 130 may collect voice data such as the voice of a user or the sound of a user's surrounding environment, to check the state of the user or the surrounding environment.

For example, the external sound collection unit 130 may collect sounds such as a child's crying sound, a sudden change in user's voice, a thunder sound, etc.

The biometric information measurement unit 140 may measure biometric information of the user, and check the current state of the user.

For example, the biometric information measurement unit 140 may include a pulse sensor and a body temperature sensor, and measure change in user's pulse, change in user's body temperature to check the current state of the user, specifically anxiety state, excitatory state, etc.

The control unit 150 may control the sound source output unit 100 according to the sound source and control command received from the electronic device 20 to adjust and reproduce the sound source.

The control command includes a sound volume value and a sound speed value of a sound source provided using the relation table between the position and motion information stored in the electronic device 20 and the sound volume and sound speed of the sound source according to the position and motion information measured by the sensor unit 110, and the control unit 150 may control the sound source received according to the sound volume value and sound speed value of the sound source to be output at the corresponding sound volume or corresponding sound speed.

Also, when the measured position and motion information maintains a predetermined value for a certain period of time, the control unit 150 may control the communication unit 120 to receive a sound source other than the currently reproduced sound source from the electronic device 20.

For example, when the position movement speed decreases in a specific section and there is no position change for a certain period of time while the sound speed and the sound volume of the rattle sound source are adjusted and reproduced in real time according to the position and motion information, it may be recognized that the user is in a drowsy state, and accordingly it is possible to control to reproduce a sound source from an induced sound source group which is received from the electronic device 20.

Figure 3:
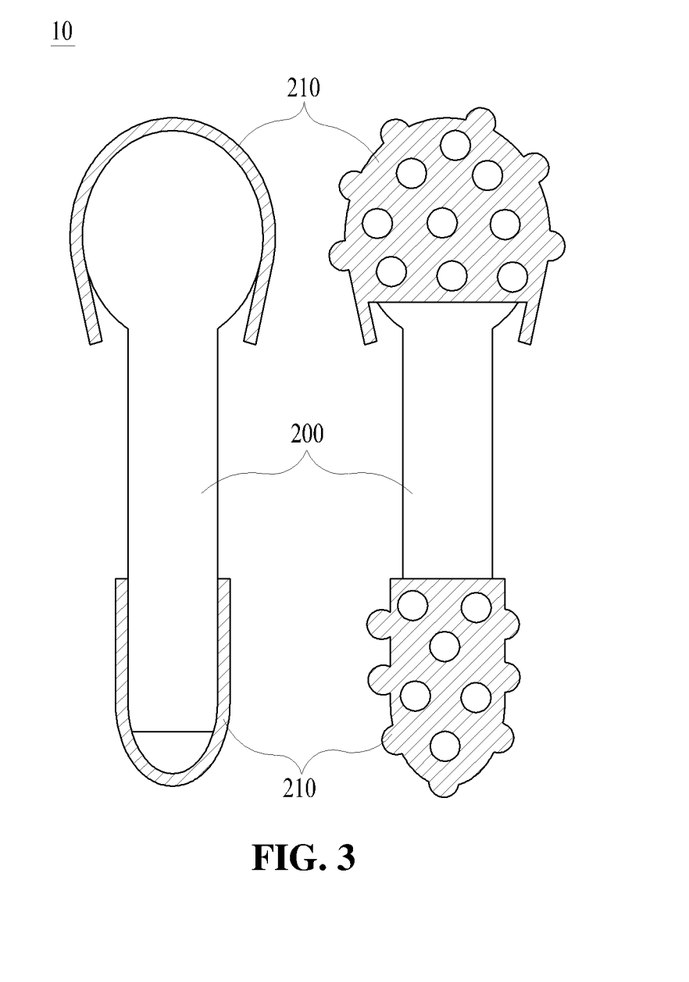
FIG. 3 is a perspective view of a toy according to an embodiment of the present invention.

FIG. 3 is a perspective view of a toy 10 according to an embodiment of the present invention.

Referring to FIG. 3, the rattle (toy) 10 uses a synthetic resin material for the exterior of the main body 200, specifically, a glossy acrylonitrile butadienestyrene (ABS) resin, thereby solving the problem that the part in direct contact with the human body is hazardous and has hygiene problems.

Also, a cover 210 of a silicon material is detachably provided at an upper end and a lower end of the main body 200 in order to cope with problems such as collision, etc.

that may occur when the rattle 10 is separated from the user. Also, for specific users, a cover of a silicon material may be used as a teether.

Further, the corresponding cover 210 may be provided to be replaceable according to the user's need.

The present embodiment presents an example where the exterior of the main body 200 is made of ABS resin, and the material of the cover 210 is silicon, but the present invention is not limited thereto. Also, it is apparent that various materials that can implement the technical feature of the present invention may be applied, and the exterior of the rattle (toy) 10 may be changed into various forms as needed.

Figure 4:
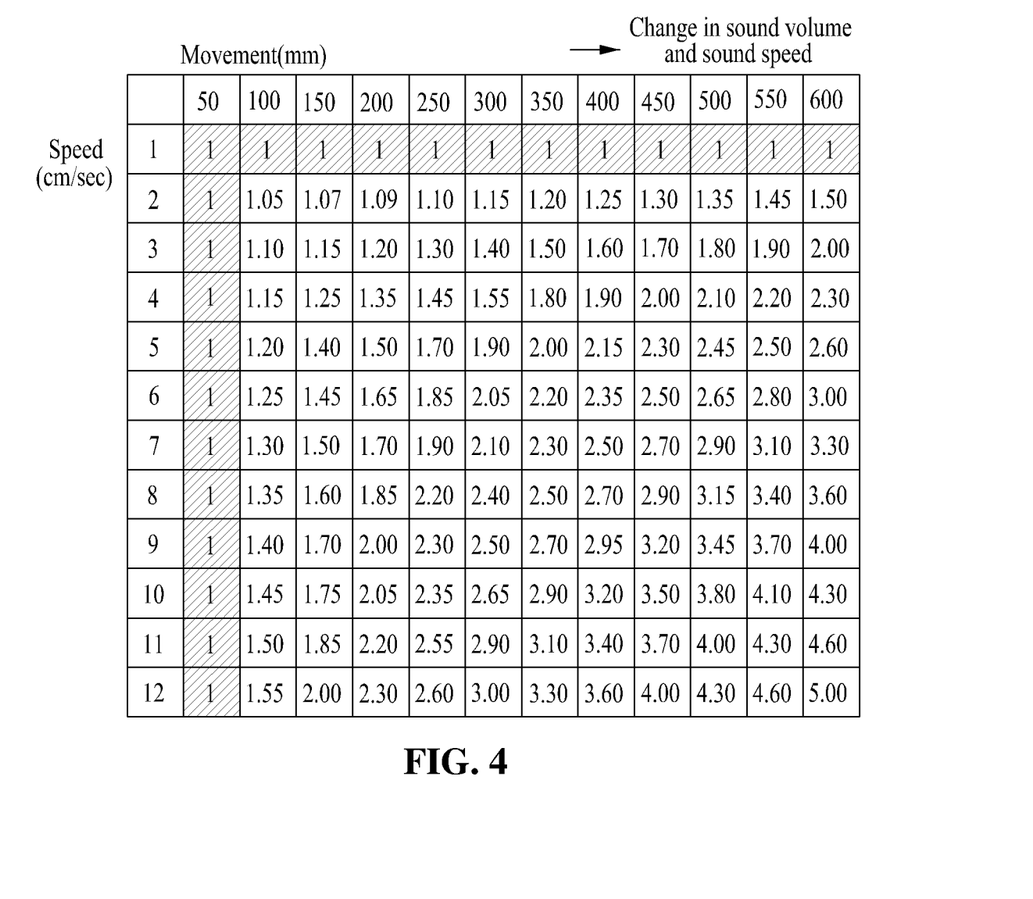
FIG. 4 illustrates a relation table between the position and motion information and the sound volume and the sound speed of a sound source according to an embodiment of the present invention.

FIG. 4 illustrates a relation table between the position and motion information and the sound volume and the sound speed of a sound source according to an embodiment of the present invention.

FIG. 4 describes the weight values of the sound volume and the sound speed according to position movement information and movement speed information among the position and motion information.

The position movement information may include a position movement distance value of the rattle (toy) 10, and the movement speed information may include a movement speed value of the rattle (toy) 10.

When the position movement is 50 mm or less and the movement speed is 1 cm/s or less, the sound volume and the sound speed of the normal original sound may stay the same.

Also, when the position movement is in a range between 200 mm and 250 mm, and the movement speed is in a range between 8 cm/s and 9 cm/s, the sound volume and the sound speed of the normal original sound may be reproduced increased by 1.85 times.

In the same manner, when the position movement is 600 mm or above and the movement speed is 12 cm/s, the sound volume and the sound speed of the normal original sound may be reproduced increased by 5 times.

The present embodiment describes the weight values of the sound volume and the sound speed according to the position movement information and movement speed information in the table, but it is obvious that an output value including at least one of the sound volume and the sound speed according to the input value including at least one of position information, position movement information, position movement time information, movement speed information, and movement acceleration information may be described in the table.

Also, the sound volume value and the sound speed value may be designated by relative weight values corresponding to the sound volume and sound speed of a normal sound source, and may be designated by absolute values.

Further, the sound volume value and the sound speed value may be designated by a dependent relation, for example, the same relative weight value or the same absolute value, and may be designated by an independent relation, specifically, by individually separating the sound volume value and sound speed value according to an input value including at least one of position information, position movement information, movement speed information, and movement acceleration information.

Also, with regard to the relation table in FIG. 4, it is possible to receive position movement information and position movement time information, and derive the resultant value after converting the above into movement speed information.

In other words, it is obvious that the received input information may be computed or data-processed according to the input value in the relation table, and applied being converted into the corresponding input value.

Figure 5:
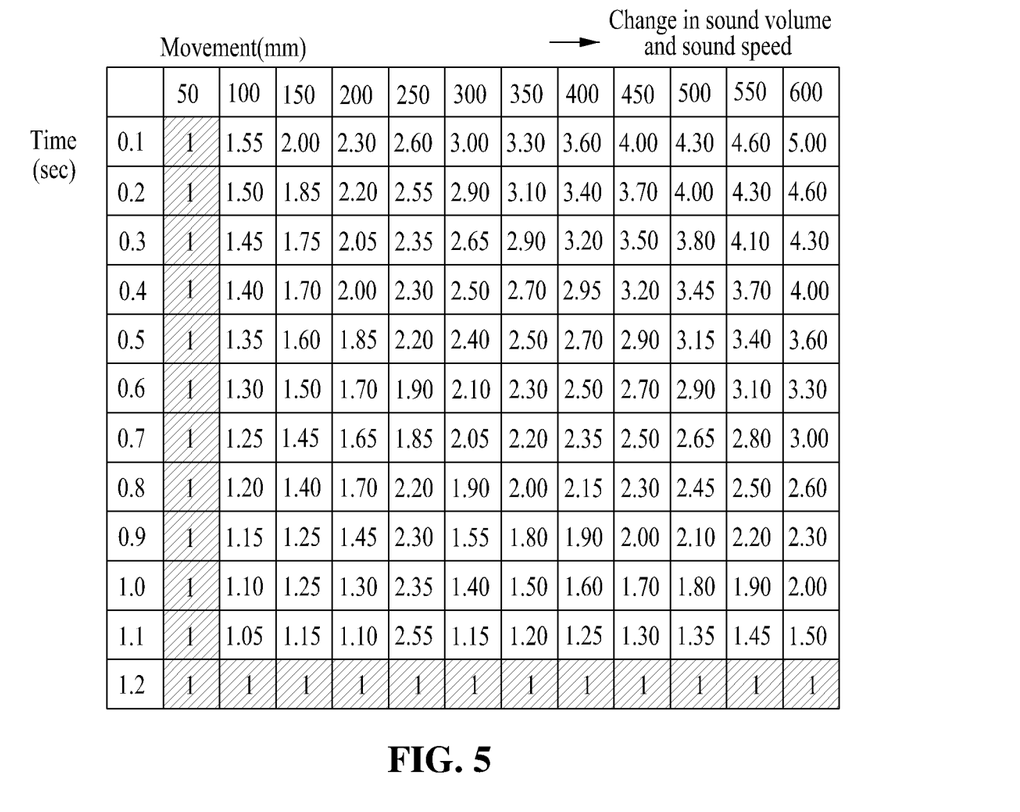
FIG. 5 illustrates a relation table between the position and motion information and the sound volume and the sound speed of a sound source according to another embodiment of the present invention.

FIG. 5 illustrates a relation table between the position and motion information and the sound volume and the sound speed of a sound source according to another embodiment of the present invention.

Referring to FIG. 5, the weight values of the sound volume and the sound speed according to the position movement information and the position movement time information among the position and motion information may be confirmed.

The position movement information may include a position movement distance value of the rattle (toy) 10, and the position movement time information may include a time value required according to the position movement of the rattle (toy) 10.

Specifically, when the position movement of the rattle (toy) 10 is in a range between 300 mm and 350 mm and the time required for position movement is within a range between 0.4 sec and 0.5 sec, the sound volume and the sound speed of the normal original sound may be reproduced increased by 2.5 times.

Also, when the position movement is 600 mm or above and the time required for position movement is in a range between 0.2 sec and 0.3 sec, the sound volume and the sound speed of the normal original sound may be reproduced increased by 4.6 times.

The present embodiment describes a case where the same sound volume value and sound speed value are applied according to the position movement and the time value required for position movement, but the present invention is not limited thereto. Also, it is apparent that a sound volume value table according to the position movement and the time value required for position movement and a sound speed value table according to the position movement and the time required for position movement may be provided separately.

It is obvious that the technical feature described with reference to FIG. 4 can be applied to FIG. 5 in the same manner.

The embodiments of the present invention disclosed in the present specification and drawings are merely illustrative examples of the present invention to easily explain the technical disclosure of the present invention and facilitate understanding of the present invention, and are not intended to limit the scope of the present invention.

Accordingly, in addition to the embodiments disclosed above, all modifications or changes derived based on the technical idea of the present invention should be construed as being included in the scope of the present invention.

What is claimed is:

1. A toy for outputting sound sources, comprising:
   a sound source output unit;
   a sensor unit configured to measure position and motion information of the toy including at least one of position information, position movement information, position movement time information, movement speed information and movement acceleration information;
   a communication unit configured to transmit, to an electronic device, the position and motion information measured by the sensor unit and to receive, from the electronic device, a sound source and a control command; and
   a control unit configured to control the sound source output unit to adjust and reproduce the received sound source according to the control command,
   wherein the control unit is configured to determine a state of a user based on the measured position and motion information, and to control to receive, from the electronic device, and reproduce another sound source other than the received sound source according to the determined state.

2. The toy of claim 1, wherein the control unit is configured to estimate an age of the user using a motion pattern generated based on the measured position and motion information, and to control to receive and reproduce a sound source in a predetermined age-specific sound source group according to the estimated age of the user.

3. The toy of claim 1, wherein the control command includes a sound volume value and a sound speed value of the sound source with respect to the measured position and motion information provided using a relation table between the predetermined position and motion information and the sound volume and the sound speed of the sound source.

4. The toy of claim 1, wherein when a position change and a position movement speed of the toy are maintained within a predetermined range for a certain period of time, the control unit is configured to determine, through the position movement information and the movement speed information, that the user is in a drowsy state, and configured to control to receive, from the electronic device, and reproduce the another sound source.

5. The toy of claim 1, further comprising:
an external voice collection unit configured to collect an external voice; and
a biometric information measurement unit configured to measure biometric information of the user,
wherein when the measured position and motion information maintains a predetermined value for a certain period of time, and the external voice collected by the external voice collection unit and the biometric information measured by the biometric information measurement unit exceed predetermined values, the electronic device is configured to manage the corresponding sound source as an abnormal sound source.

* * * * *